US009792911B2

(12) United States Patent
Veksler et al.

(10) Patent No.: US 9,792,911 B2
(45) Date of Patent: Oct. 17, 2017

(54) BACKGROUND VOICE RECOGNITION TRAINER

(71) Applicant: Panasonic Automotive Systems Company of America, Division of Panasonic Corporation of North America, Peachtree City, GA (US)

(72) Inventors: Ilya Veksler, West Bloomfield, MI (US); Ambuj Kumar, Farmington Hills, MI (US); Naveen Reddy Korupol, Troy, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 244 days.

(21) Appl. No.: 14/667,134

(22) Filed: Mar. 24, 2015

(65) Prior Publication Data

US 2015/0279355 A1    Oct. 1, 2015

Related U.S. Application Data

(60) Provisional application No. 61/970,218, filed on Mar. 25, 2014.

(51) Int. Cl.
*G10L 15/00* (2013.01)
*G10L 15/30* (2013.01)
*G10L 15/06* (2013.01)

(52) U.S. Cl.
CPC ............ *G10L 15/30* (2013.01); *G10L 15/063* (2013.01); *G10L 2015/0638* (2013.01)

(58) Field of Classification Search
CPC ........ G10L 15/06–15/075; G10L 15/26; G10L 15/30
USPC ............. 704/231, 235, 244, 270, 270.1, 275
See application file for complete search history.

(56) References Cited

U.S. PATENT DOCUMENTS

| 6,363,348 B1* | 3/2002 | Besling ................ G06K 9/6217 704/251 |
| 6,484,136 B1* | 11/2002 | Kanevsky ........... G06F 17/2765 704/255 |
| 7,236,932 B1* | 6/2007 | Grajski .......................... 704/277 |
| 2002/0065657 A1* | 5/2002 | Reding et al. ................ 704/246 |
| 2002/0123894 A1* | 9/2002 | Woodward .............. G10L 15/22 704/260 |
| 2003/0036903 A1* | 2/2003 | Konopka et al. ............. 704/249 |
| 2004/0064317 A1* | 4/2004 | Othmer et al. ............... 704/260 |

(Continued)

*Primary Examiner* — Shaun Roberts
(74) *Attorney, Agent, or Firm* — Laurence S. Roach, Esq.

(57) ABSTRACT

A method of operating a speech recognition system includes converting a spoken utterance by a user into an electrical voice signal by use of a local microphone associated with a local electronic device. The electrical voice signal is transmitted to a remote voice recognizer. The remote voice recognizer is used to transcribe the electrical voice signal and to produce a confidence score. The confidence score indicates a level of confidence that the transcription of the electrical voice signal substantially matches the words of the spoken utterance. The transcription of the electrical voice signal and the confidence score are transmitted from the remote voice recognizer to the local electronic device. The electrical voice signal, the transcription of the electrical voice signal, and the confidence score are used at the local device to train a local voice recognizer.

20 Claims, 1 Drawing Sheet

(56) References Cited

U.S. PATENT DOCUMENTS

| | | | |
|---|---|---|---|
| 2009/0313005 A1* | 12/2009 | Jaquinta | G06F 17/289 704/2 |
| 2012/0245934 A1* | 9/2012 | Talwar et al. | 704/235 |
| 2012/0310645 A1* | 12/2012 | Gruenstein et al. | 704/235 |
| 2013/0030804 A1* | 1/2013 | Zavaliagkos | G10L 15/26 704/235 |
| 2013/0132084 A1* | 5/2013 | Stonehocker et al. | 704/244 |
| 2013/0151250 A1* | 6/2013 | VanBlon | G10L 15/32 704/235 |

\* cited by examiner

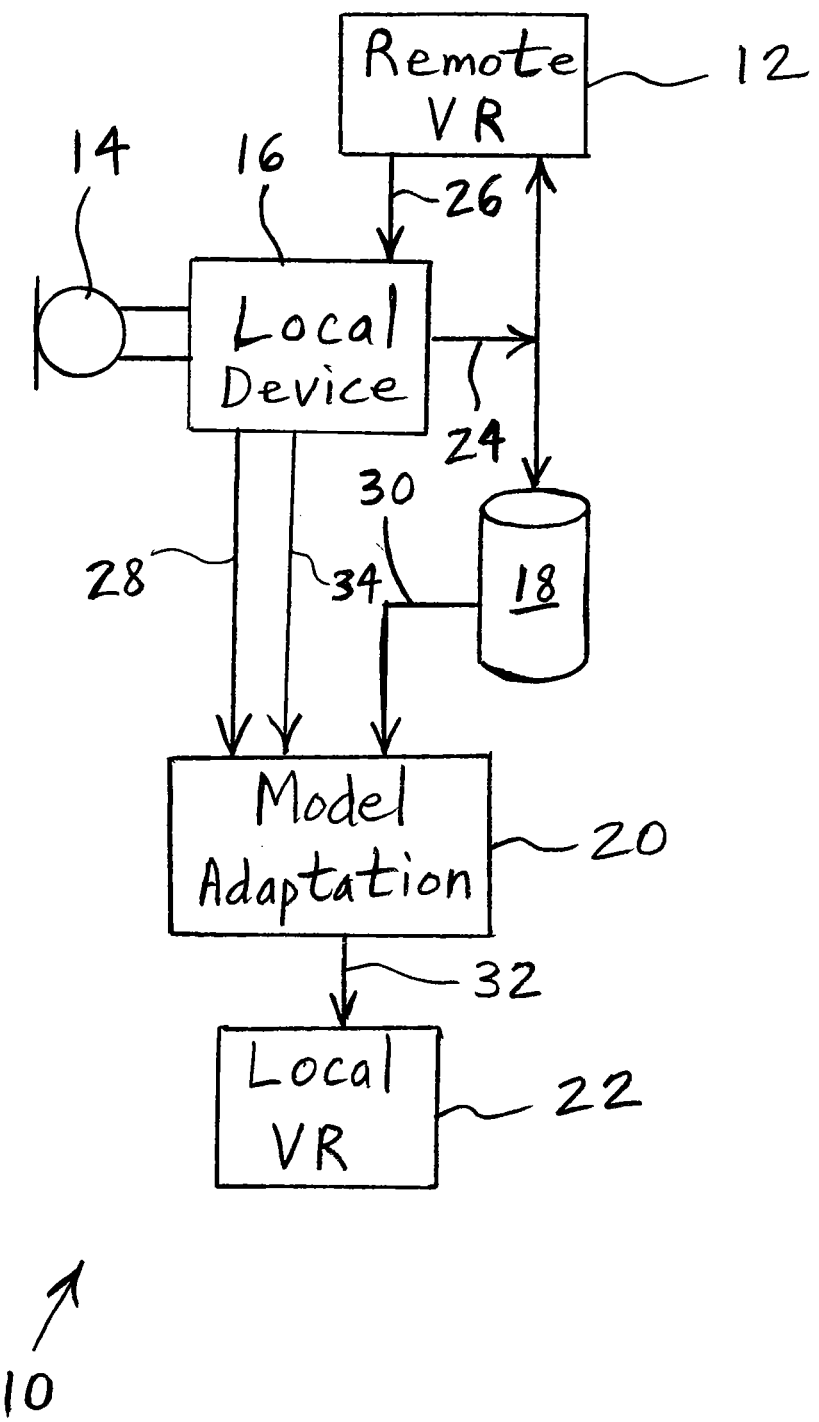

BACKGROUND VOICE RECOGNITION TRAINER

CROSS-REFERENCE TO RELATED APPLICATIONS

This application claims the benefit of U.S. Provisional Application No. 61/970,218, filed on Mar. 25, 2014, which the disclosure of which is hereby incorporated by reference in its entirety for all purposes.

BACKGROUND OF THE INVENTION

1. Field of the Invention

The present invention relates to voice recognition systems, and, more particularly, to the training of a voice recognition system.

2. Description of the Related Art

Voice recognition systems are often provided on local devices, such as smart phones, personal computers, and vehicle infotainment systems. Such voice recognition systems may transcribe the speech more accurately and quickly if the user first trains the system to recognize his particular voice, speech patterns, pronunciations accent, articulation, roughness, nasality, pitch, volume and speed. In reality, however, users almost never take the time to go through the training sequence.

SUMMARY OF THE INVENTION

The invention may provide a way of improving performance of the local voice recognizer in the context of a hybrid voice recognition system including both an off-board or remote voice recognizer and an on-board, embedded, or local device having a local voice recognizer. The local device may normally use the remote voice recognizer because of its better performance, but may use the local voice recognizer when there is no connectivity with the remote voice recognizer. The remote voice recognizer may include a server which receives speech recordings transmitted by the local device. The server processes and recognizes the speech, and transcribes the recognized speech to text. The text produced by the remote server is then transmitted back to the local device. The local device may then use the text in conjunction with the associated speech recording to train the local voice recognizer without any special effort being required of the user.

The invention may provide a background training method in which a local voice recognizer is trained when a remote server-based voice recognizer is used for speech recognition.

In one embodiment, the invention comprises a method of operating a speech recognition system, including converting a spoken utterance by a user into an electrical voice signal by use of a local microphone associated with a local electronic device. The electrical voice signal is transmitted to a remote voice recognizer. The remote voice recognizer is used to transcribe the electrical voice signal and to produce a confidence score. The confidence score indicates a level of confidence that the transcription of the electrical voice signal substantially matches the words of the spoken utterance. The transcription of the electrical voice signal and the confidence score are transmitted from the remote voice recognizer to the local electronic device. The electrical voice signal, the transcription of the electrical voice signal, and the confidence score are used at the local device to train a local voice recognizer.

In another embodiment, the invention comprises a motor vehicle speech recognition arrangement including a local electronic device having a local microphone disposed in the motor vehicle. The local microphone converts a spoken utterance by a user into an electrical voice signal. The local electronic device transmits the electrical voice signal. A remote voice recognizer disposed outside the vehicle receives the electrical voice signal, transcribes the electrical voice signal, produces a confidence score, and transmits the transcription of the electrical voice signal and the confidence score to the local electronic device. The confidence score indicates a level of confidence that the transcription of the electrical voice signal substantially matches the words of the spoken utterance. A local voice recognizer disposed in the motor vehicle is trained by use of the electrical voice signal, the transcription of the electrical voice signal, and the confidence score.

In yet another embodiment, the invention comprises a method of operating a speech recognition system, including converting a spoken utterance by a user into an electrical voice signal by use of a local microphone associated with a local electronic device. The electrical voice signal is transmitted to a remote voice recognizer. The remote voice recognizer is used to transcribe the electrical voice signal. The transcription of the electrical voice signal is transmitted from the remote voice recognizer to the local electronic device. In response to receiving confirmation from the user that the transcription of the electrical voice signal substantially matches the words of the spoken utterance, the electrical voice signal, the transcription of the electrical voice signal and the confirmation from the user are used to train the local voice recognizer. In response to receiving denial from the user that the transcription of the electrical voice signal substantially matches the words of the spoken utterance, the electrical voice signal and the transcription of the electrical voice signal are omitted from use in training the local voice recognizer. In response to receiving neither confirmation nor denial from the user that the transcription of the electrical voice signal substantially matches the words of the spoken utterance, the electrical voice signal and the transcription of the electrical voice signal are used to train the local voice recognizer.

An advantage of the present invention is that it may leverage a server-based voice recognition system to train a local voice recognition system. Server-based voice recognition systems benefit from a huge acoustic model training sample size, and thus are capable of providing better recognition results. Local recognizers have more limited acoustic models and can benefit from acoustic model training by the user.

Another advantage of the invention is that the background voice recognition trainer leverages the remote off-board voice recognition engine to train the local on-board voice recognition engine without any special effort from the user.

Yet another advantage of the invention is that it solves the problem of low participation rate in voice recognition system user training. According to the invention, local voice recognition training occurs in the normal course of voice recognition system usage when the remote voice recognition engine is available.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 1 is a block diagram of one embodiment of a voice recognition system of the present invention.

DETAILED DESCRIPTION

Glossary

Transcription—electrical voice signals that have been converted into text

Voice recognizer—hardware and/or software that recognizes spoken utterances that have been converted into electrical voice signals The embodiments hereinafter disclosed are not intended to be exhaustive or limit the invention to the precise forms disclosed in the following description. Rather the embodiments are chosen and described so that others skilled in the art may utilize its teachings.

FIG. 1 is a block diagram of one embodiment of a voice recognition system 10 of the present invention, including a remote voice recognizer 12, a local microphone 14, a local device 16, a local memory device 18, a local model adaptation module 20, and a local voice recognizer 22. Local device 16 may be a smart phone, personal computer, or vehicle infotainment system, for example.

During use, microphone 14 senses words spoken by the user and transforms the audible sound into an electronic signal or sample voice recording that is transmitted to local device 16. As indicated at 24, the sample voice recording is stored in memory device 18 as well as transmitted to remote voice recognizer 12. The transmission to remote voice recognizer 12 may be a wireless transmission.

Off-board voice recognizer 12 may create text transcripts of recognized speech hypotheses, along with confidence scores for each hypothesis. As indicated at 26, off-board voice recognizer 12 may then transmit the text transcripts and confidence scores to local device 16.

If the confidence score is sufficiently high (e.g., greater than 90%), then the sample voice recording and text transcription are saved as training data. When a sufficient amount of data of high confidence level has been stored, then the text transcriptions and sample voice recordings are transmitted to background acoustic model adaptation 20, as indicated at 28 and 30, respectively. The adaptation may then be run in the background to train local voice recognizer 22, as indicated at 32.

In another embodiment, sample filtering is further enhanced by using user confirmation in voice human machine interface (HMI). For example, the text transcripts may be fed back to the user, such as via text on a display screen or audibly via a speaker within the passenger compartment. The user then may confirm or deny that the text transcripts accurately reflect what the user actually said. For example, the user may speak his confirmation or denial, and these spoken words may be captured by microphone 14. If the user denies that the text transcripts accurately reflect what the user actually said, then that sample voice recording is not used by model adaptation 20 in training local voice recognizer 22. On the other hand, if the user does confirm that the text transcripts accurately reflect what the user actually said, then the confirmation is transmitted from local device 16 to model adaptation 20, as indicated at 34, and this confirmation is used by model adaptation 20 in training local voice recognizer 22. If the user neither confirms nor denies that the text transcripts accurately reflect what the user actually said, then the training of local voice recognizer 22 proceeds as described above in the previous embodiment.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a speech recognition system, comprising the steps of:
   converting a spoken utterance by a user into an electrical voice signal by use of a local microphone associated with a local electronic device;
   transmitting the electrical voice signal to a remote voice recognizer;
   using the remote voice recognizer to transcribe the electrical voice signal and to produce a confidence score, the confidence score indicating a level of confidence that the transcription of the electrical voice signal substantially matches the words of the spoken utterance;
   transmitting the transcription of the electrical voice signal and the confidence score from the remote voice recognizer to the local electronic device; and
   using the electrical voice signal, the transcription of the electrical voice signal and the confidence score at the local electronic device to train a local voice recognizer.

2. The method of claim 1 comprising the further steps of:
   receiving confirmation from the user that the transcription of the electrical voice signal substantially matches the words of the spoken utterance; and
   using the confirmation from the user to train the local voice recognizer.

3. The method of claim 1 wherein the training of the local voice recognizer is performed only if the confidence score is above a threshold level.

4. The method of claim 1 comprising the further step of storing the electrical voice signal and the transcription of the electrical voice signal, the training of the local voice recognizer being performed only after more than a threshold amount of data associated with the electrical voice signals and the transcriptions of the electrical voice signals has been stored.

5. The method of claim 1 wherein the local microphone, the local electronic device, and the local voice recognizer are disposed within a motor vehicle, and the remote voice recognizer is disposed outside the motor vehicle.

6. The method of claim 5 wherein the remote voice recognizer is disposed in a building away from the motor vehicle.

7. The method of claim 1 wherein the transmitting steps are performed wirelessly.

8. A motor vehicle speech recognition arrangement, comprising:
   a local electronic device including a local microphone disposed in the motor vehicle, the local microphone being configured to convert a spoken utterance by a user into an electrical voice signal, the local electronic device being configured to transmit the electrical voice signal;
   a remote voice recognizer disposed outside the vehicle and configured to:
   receive the electrical voice signal;

transcribe the electrical voice signal;
produce a confidence score, the confidence score indicating a level of confidence that the transcription of the electrical voice signal substantially matches the words of the spoken utterance; and
transmit the transcription of the electrical voice signal and the confidence score to the local electronic device; and
a local voice recognizer disposed in the motor vehicle, the local voice recognizer configured to be trained by use of the electrical voice signal, the transcription of the electrical voice signal and the confidence score.

9. The arrangement of claim 8 wherein the local electronic device is configured to:
receive confirmation from the user that the transcription of the electrical voice signal substantially matches the words of the spoken utterance; and
use the confirmation from the user to train the local voice recognizer.

10. The arrangement of claim 8 wherein the local electronic device is configured to train the local voice recognizer only if the confidence score is above a threshold level.

11. The arrangement of claim 8 further comprising a memory device disposed in the motor vehicle and configured to store the electrical voice signal and the transcription of the electrical voice signal, the local electronic device being configured to train the local voice recognizer only after more than a threshold amount of data associated with the electrical voice signals and the transcriptions of the electrical voice signals has been stored.

12. The arrangement of claim 8 wherein the remote voice recognizer is disposed in a building away from the motor vehicle.

13. The arrangement of claim 8 wherein the electrical voice signal, the transcription of the electrical voice signal, and the confidence score are transmitted wirelessly.

14. The arrangement of claim 8 wherein the local electronic device is configured to respond to a denial received from the user that the transcription of the electrical voice signal substantially matches the words of the spoken utterance by not using the transcription to train the local voice recognizer.

15. A method of operating a speech recognition system, comprising the steps of:
converting a spoken utterance by a user into an electrical voice signal by use of a local microphone associated with a local electronic device;
transmitting the electrical voice signal to a remote voice recognizer;
using the remote voice recognizer to transcribe the electrical voice signal;
transmitting the transcription of the electrical voice signal from the remote voice recognizer to the local electronic device;
in response to receiving confirmation from the user that the transcription of the electrical voice signal substantially matches the words of the spoken utterance, using the electrical voice signal, the transcription of the electrical voice signal and the confirmation from the user to train the local voice recognizer;
in response to receiving denial from the user that the transcription of the electrical voice signal substantially matches the words of the spoken utterance, omitting the electrical voice signal and the transcription of the electrical voice signal from use in training the local voice recognizer; and
in response to receiving neither confirmation nor denial from the user that the transcription of the electrical voice signal substantially matches the words of the spoken utterance, using the electrical voice signal and the transcription of the electrical voice signal to train the local voice recognizer.

16. The method of claim 15 further comprising using the remote voice recognizer to produce a confidence score, the confidence score indicating a level of confidence that the transcription of the electrical voice signal substantially matches the words of the spoken utterance, wherein the training of the local voice recognizer is performed only if the confidence score is above a threshold level.

17. The method of claim 15 comprising the further step of storing the electrical voice signal and the transcription of the electrical voice signal, the training of the local voice recognizer being performed only after more than a threshold amount of data associated with the electrical voice signals and the transcriptions of the electrical voice signals has been stored.

18. The method of claim 15 wherein the local microphone, the local electronic device, and the local voice recognizer are disposed within a motor vehicle, and the remote voice recognizer is disposed outside the motor vehicle.

19. The method of claim 18 wherein the remote voice recognizer is disposed in a building away from the motor vehicle.

20. The method of claim 15 wherein the transmitting steps are performed wirelessly.

* * * * *